(12) United States Patent
Clayton

(10) Patent No.: US 10,973,220 B2
(45) Date of Patent: Apr. 13, 2021

(54) SPRAYER SYSTEM

(71) Applicant: Micron Sprayers Limited, Bromyard (GB)

(72) Inventor: John S. Clayton, Bromyard (GB)

(73) Assignee: Micron Sprayers Limited, Bromyard (GB)

( * ) Notice: Subject to any disclaimer, the term of this patent is extended or adjusted under 35 U.S.C. 154(b) by 7 days.

(21) Appl. No.: 15/536,017

(22) PCT Filed: Dec. 14, 2015

(86) PCT No.: PCT/GB2015/053939
§ 371 (c)(1),
(2) Date: Jun. 14, 2017

(87) PCT Pub. No.: WO2016/097701
PCT Pub. Date: Jun. 23, 2016

(65) Prior Publication Data
US 2017/0360022 A1 Dec. 21, 2017

(30) Foreign Application Priority Data
Dec. 16, 2014 (GB) ...................................... 1422383

(51) Int. Cl.
*B05B 1/28* (2006.01)
*A01M 7/00* (2006.01)

(52) U.S. Cl.
CPC ............. *A01M 7/0064* (2013.01); *B05B 1/28* (2013.01)

(58) Field of Classification Search
CPC ........ B05B 1/28; A01M 7/0064; A01M 7/005

USPC .............................. 239/103, 104, 288–288.5
See application file for complete search history.

(56) References Cited

U.S. PATENT DOCUMENTS

| | | | | |
|---|---|---|---|---|
| 3,439,875 A * | 4/1969 | Randall et al. | ........ | B60V 1/046 239/8 |
| 4,646,971 A * | 3/1987 | Rogers | ................ | A01M 7/0042 239/166 |
| 5,310,116 A * | 5/1994 | Broyhill | .............. | B05B 15/0443 239/172 |
| 9,038,922 B1 * | 5/2015 | McLeod | ................... | B05B 1/28 239/11 |
| 2006/0011741 A1 | 1/2006 | Hahn | | |
| 2010/0270419 A1 * | 10/2010 | Yoeli | ................... | B64C 29/0025 244/12.1 |

(Continued)

FOREIGN PATENT DOCUMENTS

| | | |
|---|---|---|
| DE | 29623235 | 1/1998 |
| FR | 2964046 | 3/2012 |
| WO | WO2005/028122 | 3/2005 |

*Primary Examiner* — Jason J Boeckmann
(74) *Attorney, Agent, or Firm* — DeLio Peterson & Curcio LLC; Thomas E. Ciesco

(57) ABSTRACT

A sprayer for spraying liquid onto a target area or band, the sprayer comprising a shield (10) and a nozzle arrangement for spraying liquid in a spray pattern. The shield (10) comprises a hood (12) at an upper portion of the shield (10) and a flexible skirt (14) at a lower portion of shield (10). The shield (10) surrounds the nozzle arrangement and the spray pattern allowing liquid to be sprayed onto the target area or band through an opening at the bottom of the shield (10). The skirt (14) comprises an inner membrane (40) and an outer membrane (42) which encircle the opening.

21 Claims, 6 Drawing Sheets

(56) References Cited

U.S. PATENT DOCUMENTS

2016/0121354 A1* 5/2016 Turnage ............... B05B 13/005
253;239/499

* cited by examiner

SPRAYER SYSTEM

BACKGROUND OF THE INVENTION

1. Field of the Invention

This invention relates to a protective shield for a nozzle or multiples thereof for the band spraying of plant protection products or other liquids.

2. Description of Related Art

Sprayers are used for the application of Plant Protection Products (PPPs) or other liquids. These liquids may be sprayed on to the ground or on to weeds, crops, vegetation or any other surface. For example, one of the applications of a band sprayer is for inter row band spraying in tree and bush crops and row crops. There has been increasing interest in these sprayers, driven in part due to the loss of post emergence herbicides in vegetable and other crops as well as the desire to reduce overall pesticide use. The increasing adoption of precision farming techniques using GPS and other guidance techniques to accurately plant and apply PPPs to the crop or inter row has helped promote band spraying as a practical alternative to broadcast sprays in some situations. Band spraying offers the potential to reduce usage of PPPs, particularly with herbicides, lower the risk of spray drift and environmental impact, ensure product efficacy and reduce costs.

Shields are used to control the spread of the spray from the nozzle(s) enclosed within to prevent spray contacting a non-target area, avoiding waste and environmental contamination. These shields come in a variety of shapes and sizes to meet the spray patterns required by the situation. Known protective shields have problems where liquids sprayed inside the shield collect on the edges of the shields and this liquid can then be transferred by contact to non-target crops, vegetation or other surfaces by contact. Liquid that collects on the outside of a shield is undesirable as these liquids may be for weed-killing purposes and can damage the crops or vegetation.

The present invention seeks to provide an improved method of preventing liquid reaching the outer surface of a spray shield. The invention seeks to overcome or ameliorate at least one of the disadvantages of the prior art, or provide a useful alternative

SUMMARY OF THE INVENTION

According to a first aspect of the present invention there is provided a sprayer for spraying liquid onto a target area or band comprising a shield and a nozzle arrangement for spraying liquid in a spray pattern. The shield comprises a hood at an upper portion of the shield and a flexible skirt at a lower portion of shield. The shield surrounds the nozzle arrangement and the spray pattern allowing liquid to be sprayed onto the target area or band through an opening at the bottom of the shield. The skirt comprises an inner membrane and an outer membrane which encircle the opening. This has the advantage that liquid sprayed from the nozzle arrangement does not collect on the outer membrane and the liquid is then much less likely to be lost outside the target area or to come into contact with crops, vegetation etc, that touch the outside of the shield.

The inner membrane may extend downwards towards the target area or band and the outer membrane may extend downwards towards the target area or band and outwardly from the centre of the skirt at an angle. The advantage of this is that there may not be much clearance between the target area or band and the bottom of the shield and a distance is kept between the inner and outer membranes so they are not in contact with each other.

The outer membrane may extend closer to the target area or band than the inner membrane. This has the advantage of maintaining the integrity of the inner membrane and stopping the inner membrane from wearing out before the outer membrane.

The skirt may be detachable from the hood. This allows the skirt to be removed and replaced without having to remove the whole shield.

The skirt may be attached to the hood by quick release fasteners. This has the advantage that worn or damaged skirts can be quickly replaced.

The outer membrane may comprise stiffening ribs. This means the skirt can quickly return to shape after contacting the ground or objects in its path and maintain the necessary gap between the inner and outer membranes.

One of the stiffening ribs may extend around the circumference of the lowermost part of the outer membrane and further stiffening ribs may be spaced around the circumference of the outer membrane and may extend upwards from the lowermost part of the outer membrane. This maintains the overall shape of the skirt whilst minimising use of material.

The hood may be made of metal or plastics. This provides rigidity to the shield.

The skirt may be made of an elastomer or equally flexible material. This has the advantage of allowing the outer membrane to deform if it comes into contact with hard objects, such as stones, or even the stems of trees or bush crops, which avoids them being sprayed.

The shield may be cone shaped or dome shaped. This allows the sprayer to have a spray pattern that impacts a relatively large target area or band.

The outer membrane may be oval with longitudinal ends of the outer membrane extending at an angle greater than the angle at which transverse sides of the outer membrane extend. This has the advantage that the longitudinal ends are pointier and can push crops, vegetation etc., to the side of the shield. The flexible nature of the skirt also allows crops, vegetation etc., to be pushed aside without damaging them.

The opening of the shield may be oval. This can, for example, match the general width of the inter crop row and gives a large target area or band to spray the liquid onto.

The opening of the shield may be circular. This gives a large target area or band to spray the liquid onto and provides the best shape for some applications.

The opening of the shield may be rectangular. This gives a large target area or band to spray the liquid onto and provides the best shape for some applications.

The sprayer may further comprise a ground following mechanism.

The flexible skirt may act to deflect the crops away from the shield.

The shield may be flexible enough to deform around the crop or object to allow spraying right up to the crop or object.

According to a second aspect of the present invention there is provided a shield as defined in any of the statements above for use in a sprayer for spraying liquid onto a target area or band.

The target area or band may be the ground in crop inter rows.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
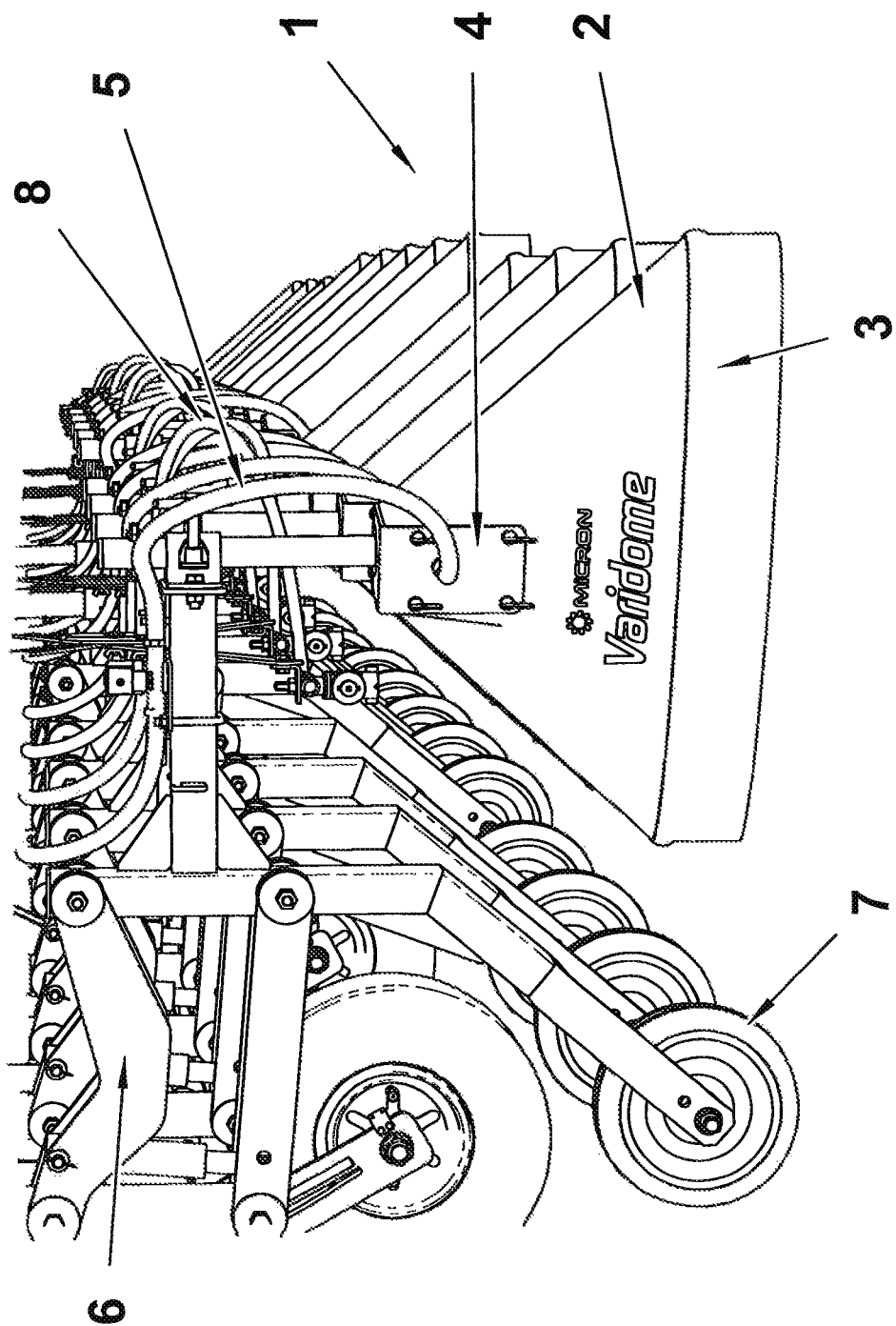
FIG. 1 shows a side view of known protective shields in use.

FIG. 1 shows known protective shields 1 in use being towed behind a vehicle (not shown). The shields 1 are arranged in a line perpendicular to the direction of travel. The shield 1 comprises a rigid hood 2 and a flexible rubber skirt 3 which is attached to the bottom of the hood 2. The shields 1 are each connected to a toolbar via support brackets 4. The shields 1 house a spray nozzle (not shown), supplied through a spray hose 5, which sprays the crop inter row with the desired liquids (e.g PPPs) with little or no spray drift. The functionality of the shields 1 is enhanced by a parallelogram linkage 6, a ground following wheel 7 and the skirt 3 which deflects stones and lumps of soil. In particular, the ground following wheel 7 is useful in decreasing the clearance from the ground to the underside of the skirt 3 to minimize the potential for spray drift or movement on to non-target areas. However, the shield 1 can still perform its function without the ground following wheels 7. A corresponding second spray hose 8 for each shield 1 supplies an external nozzle (also not shown) located to one side of the shield 1 for spraying liquids (e.g. fertiliser, fungicides or insecticides) directly onto the crops.

Figure 1A:
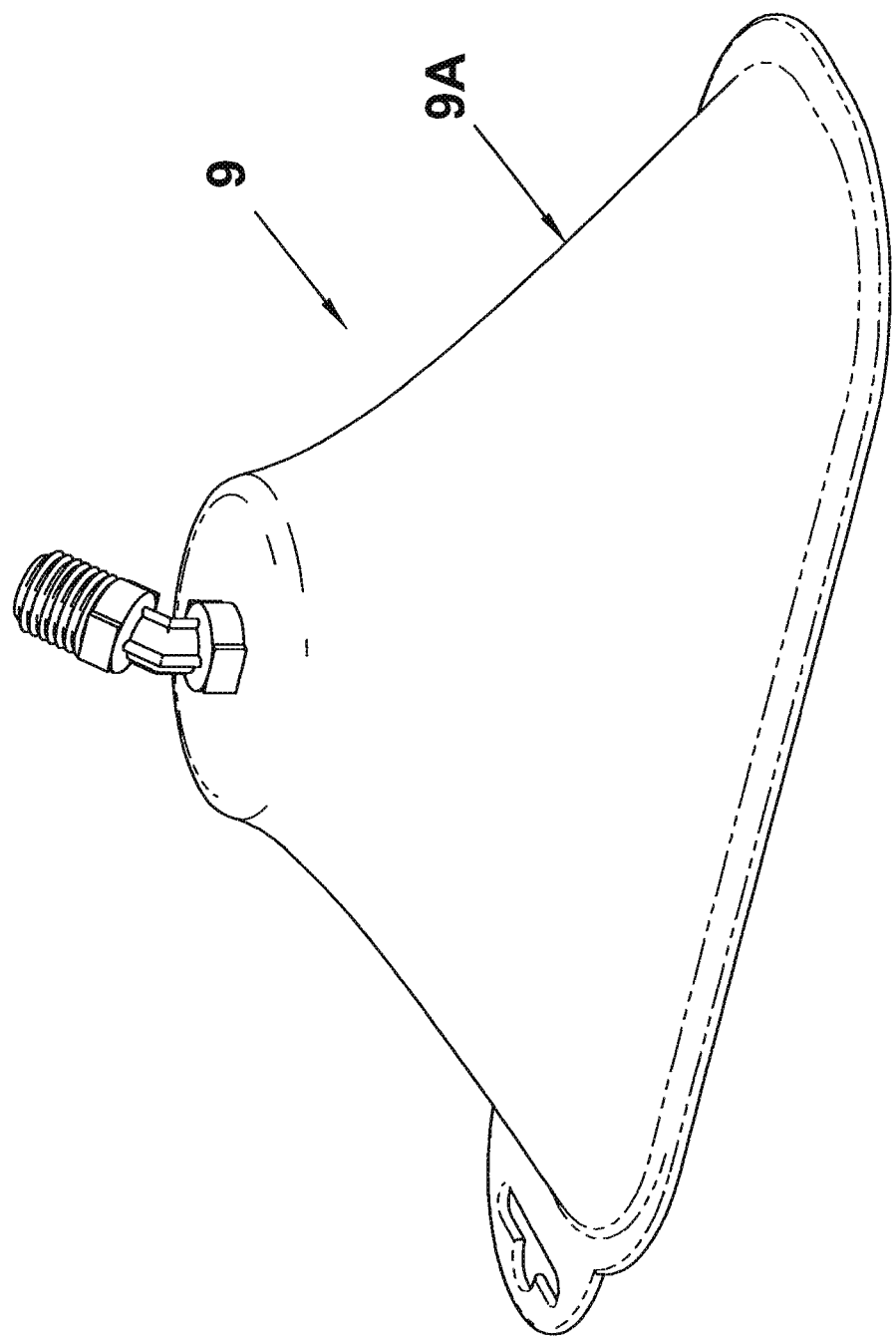
FIG. 1A shows a side view of another known protective shield.

FIG. 1A shows another known protective shield 9 which only comprises a rigid hood 9A, i.e. no flexible skirt. This may be used on any suitable sprayer system to direct sprayed liquid where required.

Figure 2:
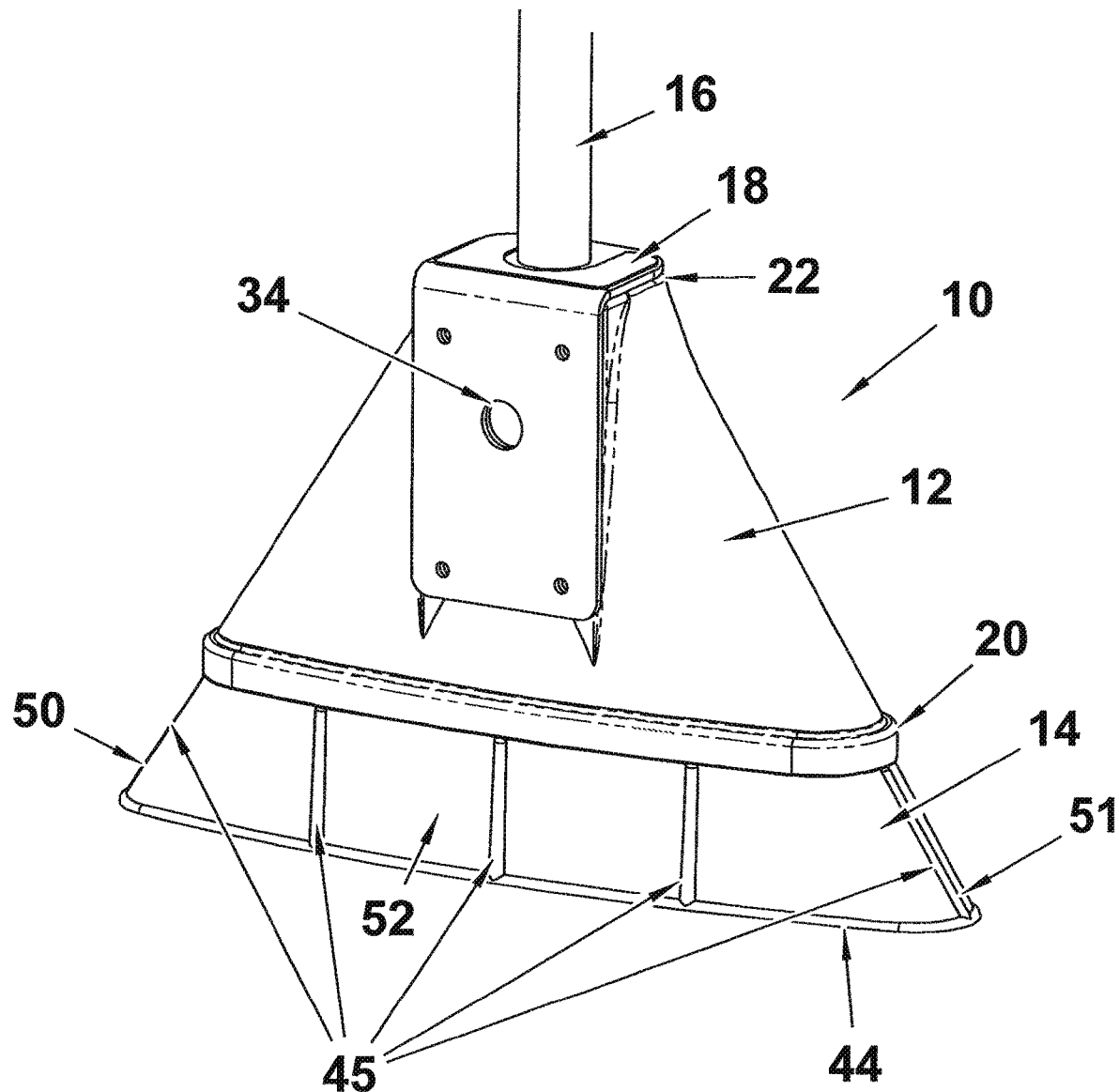
FIG. 2 shows a side view of a protective shield in accordance with an embodiment of the present invention.

With reference to FIG. 2, there is provided a shield 10 for a sprayer used to spray liquid onto a target area on the ground. The shield 10 has an opening at the bottom through which liquid can be sprayed onto a target area on the ground. The shield 10 comprises a hood 12 at an upper portion and a skirt 14 at a lower portion. The skirt 14 is detachable from the hood 12. In other embodiments, the skirt 14 may be integral to the hood 12. The hood 12 is rigid. The hood 12 is made from metal or plastics, which may be formed by, for example, steel forming, rotational or injection moulding. The skirt 14 is flexible. The skirt 14 is made from a flexible material, which may be, for example, an elastomer (e.g. EPDM, Nitrile or natural rubber). The hood 12 is connected to a tubular pole 16 via a support bracket 18. The pole 16 connects to a frame (not shown) which has additional spray shields, various mechanisms and plumbing to enable the spraying to occur as required. In this embodiment, the hood 12 is cone-shaped and is oval, i.e. with an oval base at a bottom section 20. Thus the shield 10 is also cone-shaped with an oval base. The hood, and therefore the shield, is flared at its bottom section. In other embodiments, the hood, and therefore shield, may be dome-shaped. In other embodiments, the hood, and therefore shield, may be any other suitable shape for the desired spray pattern, such as cylindrical, elliptical or with a triangular cross section. The hood 12 extends upwards from the bottom section 20 of the hood 12. The bottom section 20 of the hood is the closest part of the hood 12 to the ground. In other embodiments the hood 12 base could be different shapes, e.g. circular or rectangular. Also, in other embodiments, the shield 10 may have different dimensions than those depicted in the figures.

The bottom section 20 of the hood 12 has a means for connecting the skirt 14 which will be described in more detail later. The hood 12 has relatively steep walls and a flat horizontal top section 22 where the support bracket 18 is located. The support bracket 18 is fixed to the outside of the hood 12 by, for example, four screws (not shown). A spray hose (not shown) supplies liquids (e.g. PPPs for spraying and passes through a large hole 34 in the support bracket 18).

Figure 3:
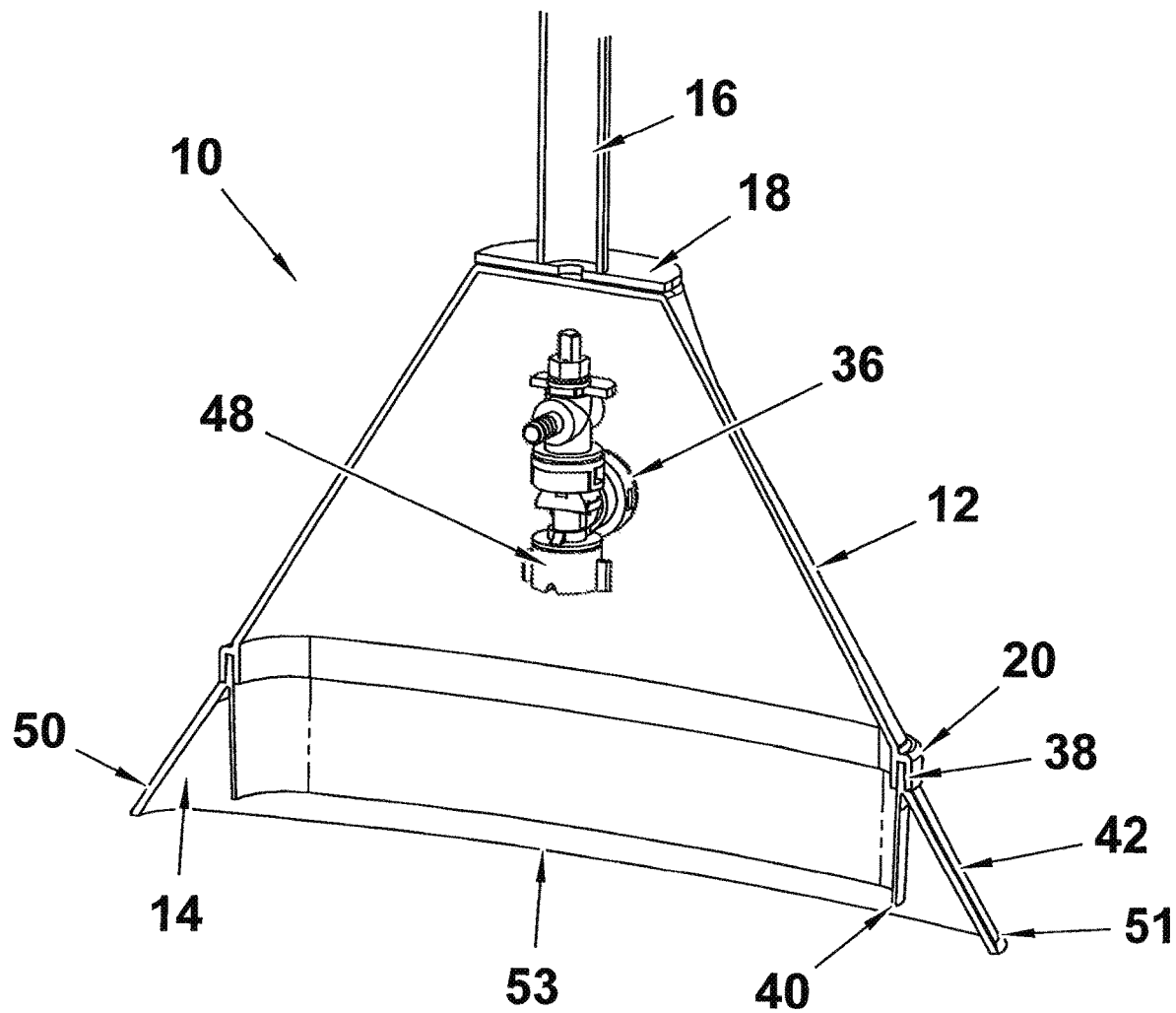
FIG. 3 shows a cross section view of a protective shield in accordance with the embodiment of FIG. 2.
Figure 3A:
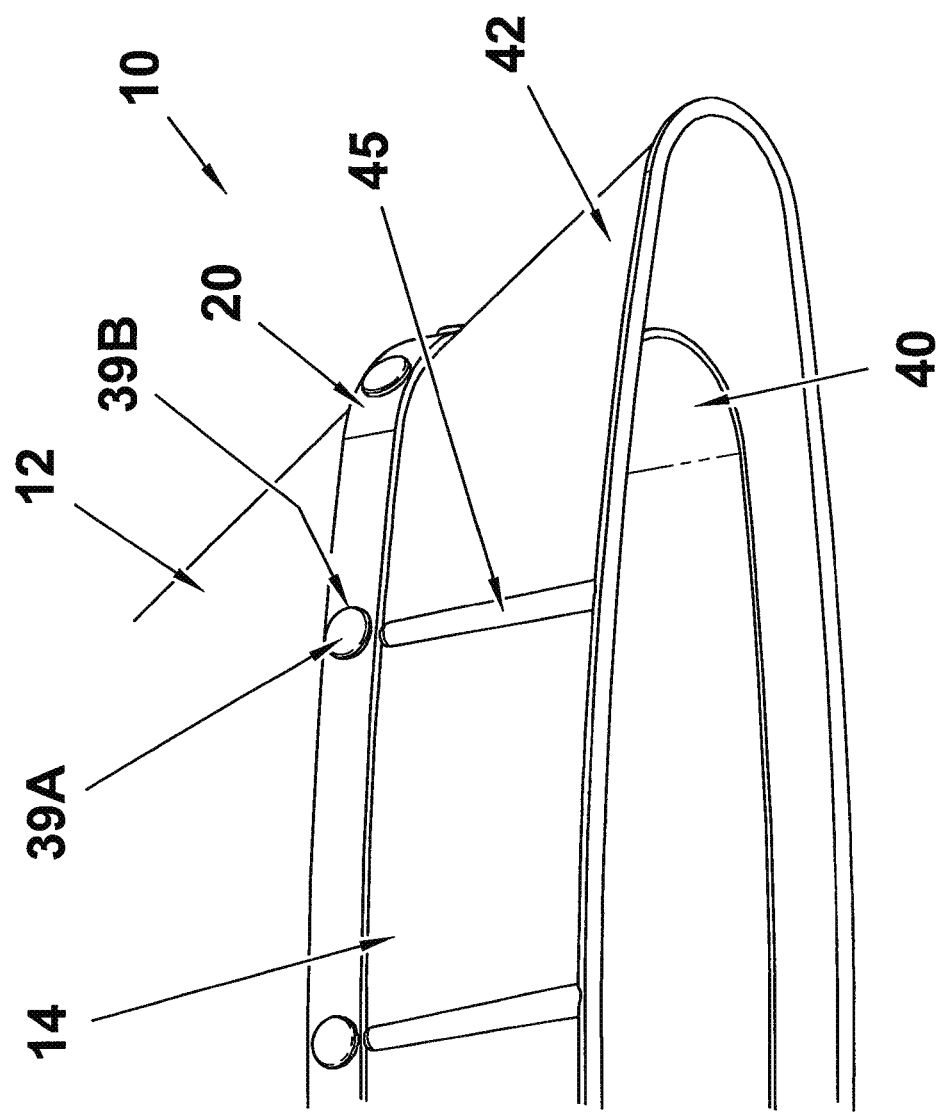
FIG. 3A shows a bottom view of a protective shield in accordance with the embodiment of FIG. 2.

Referring now to FIG. 3, a cross section of the shield 10 is shown with a spray nozzle body 36 in position. The cross section is taken through a longitudinal vertical plane of the shield 10. The bottom section 20 of the hood 12 is a vertically extending elliptical cylinder and has a channel 38 around its full circumference. The channel 38 is formed when the hood 12 is made, e.g. by injection moulding. The opening to the channel 38 faces downwards and the channel 38 is sized such that the upper end of the skirt 14 can be inserted into the channel 38 and held there. Referring now to FIG. 3A, holes 39A are drilled through the bottom section 20 of the hood 12 into the channel 38. Quick release fasteners 39B are then used to secure the skirt 14 around the bottom section 20 of the hood 12.

Referring to both FIGS. 3 and 3A, the skirt 14 comprises an inner membrane 40 which extends downwards from the channel 38. The inner membrane 40 extends fully around the circumference of the skirt 14 and is in the shape of an open-ended elliptical cylinder. The skirt 14 also comprises an outer membrane 42, connected to the inner membrane 40 directly below the channel 38, which extends outwardly and downwards at an angle. The outer membrane 42 also extends fully around the circumference of the skirt 14. The inner membrane 40 is generally thinner than the outer membrane 42. The inner membrane 40 and the outer membrane 42 comprise a double membrane (i.e. the skirt 14) which may be formed as a single component, for example in a moulding operation.

Referring once more to FIG. 2, the outer membrane 42 comprises stiffening ribs 44, 45. There is a stiffening rib 44 extending around the circumference of the lowermost part of the outer membrane 42. Also, there are stiffening ribs 45 spaced around the circumference of the outer membrane 42 extending from the lowermost part of the outer membrane 42 upwards to the top of the outer membrane 42. These stiffening ribs 45 may be equally spaced around the outer membrane 42. In other embodiments there may be different sizes and numbers of stiffening ribs.

Figure 4:
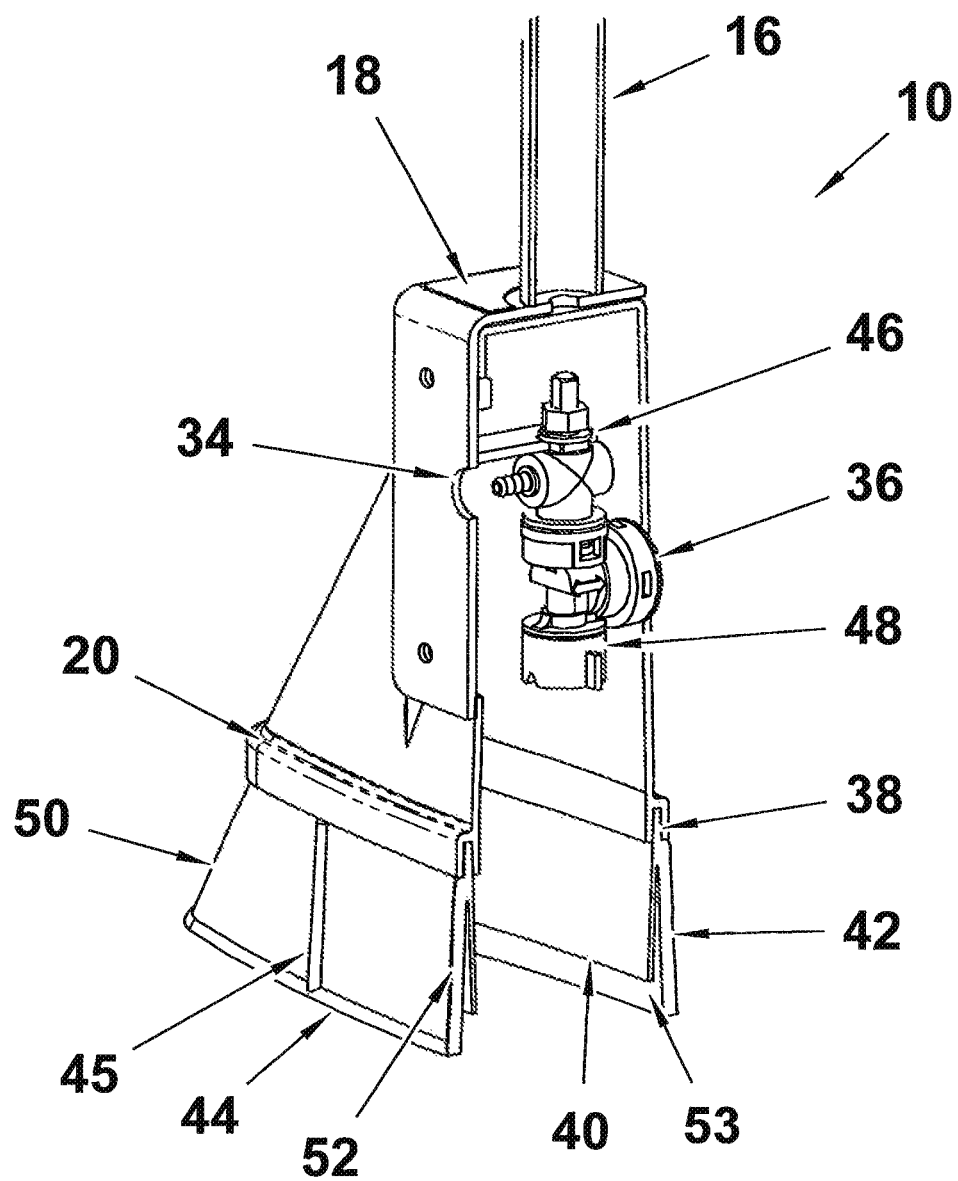
FIG. 4 shows a perspective view of another cross section of a protective shield in accordance with the embodiment of FIG. 2.

FIG. 4 shows a perspective view of a cross section taken through a transverse vertical plane of the shield 10. There is provided a bracket 46 which is fixed to the support bracket 18 and the nozzle body 36 is fitted to the distal end of the bracket 46. The nozzle body 36 hangs downwards from the bracket 46 with a nozzle tip 48 being located at the distal end of the nozzle body 36. A nozzle arrangement comprises a single nozzle (i.e. a nozzle body 36 and nozzle tip 48) or a combination of nozzles. In other embodiments, the nozzle tip 48 may also be angled.

As can be seen from both FIGS. 3 and 4, the outer membrane 42 extends further downwards, i.e. ends closer to the ground, than the inner membrane 40 does. Due to the oval shape of the base of the shield 10, the shield has two longitudinal ends 50, 51, and two transverse sides 52, 53. At the longitudinal ends 50, 51 of the outer membrane 42, the angle the outer membrane 42 makes to the vertical is larger than the angle the outer membrane 42 makes to the vertical at the transverse sides 52, 53. This means that at the longitudinal ends 50, 51, the outer membrane 42 extends further away from the inner membrane 40 and makes a sharper, pointier shape, i.e. more extended in the horizontal direction. The function of this sharper shape will be described later. A smooth transition is made to the more angled portions at the longitudinal ends 50, 51, from the transverse sides 52, 53.

In use, and as shown in the figures, the shield 10 is fixed to the support bracket 18. The shield 10 surrounds the nozzle body 36 with the attached nozzle tip 48. The spray hose is connected to the nozzle body 36 through the large hole 34 in the support bracket 18. The aim of the crop sprayer with the shield is to allow liquids, such as PPPs, to be sprayed onto specific target areas, such as areas with weeds that need to be controlled, and avoid getting the liquids onto the crops or other non-target vegetation adjacent to these areas. The PPPs, or other liquids, are sprayed through the opening in the shield 10 onto the target area on the ground (e.g. the crop inter rows) while the sprayer is moved across the ground typically on a spray boom or toolbar mounted on a vehicle (e.g. a tractor). In some embodiments, the shields 10 are mounted on toolbars in purpose-designed sprayers with independent ground following wheels which may have a parallelogram mechanism. In other embodiments, the shields 10 may simply be wheeled over the ground or be used with portable or hand-held sprayers. The sprayed liquids come out of the nozzle tip 48 in a spray pattern. The spray pattern may follow the slope of the walls of the shield 10 and then impact an oval-shaped target area on the ground. Currently, spray shields (such as those with a single rubber skirt 3 at the bottom of the shield 1 shown in FIG. 1) can collect sprayed liquid around their lower edge and may then, undesirably, transfer the PPPs or other liquids to the crop or other non-target areas/vegetation. When a spray nozzle is contained under a shield, some of the spray droplets can collect and coalesce around the bottom edge of the shield. Surface tension then causes the spray droplets to cling to the edge and gives rise to the risk of direct transfer of spray liquid to the crop or adjacent vegetation as the shield pushes through the vegetation.

Liquids, such as non-selective herbicides, which are PPPs, are passed through the spray hose to the nozzle body 36 and sprayed out of the nozzle tip 48. The liquids being sprayed in a spray pattern onto the ground will then coat the oval-shaped area (spray footprint) enclosed by the skirt 14 and will not escape outside the shield 10. In other embodiments, such as when the nozzle tip 48 is angled or when multiple nozzles are used, the target area (i.e. spray footprint) may be a different shape. Some of the spray liquid may collect on the inside of the hood 12 and the inside of the inner membrane 40 of the shield 10. This spray liquid will run down the inside of the hood 12 and onto the inside of the inner membrane 40 until finally being dripped onto the ground in the area enclosed by the inner membrane 40. The location of the inner membrane 40 between the outer membrane 42 and the nozzle tip 48 means that no (or very little) liquid sprays onto, or accumulates on, the outer membrane 42. Also, as the spray liquid runs down the inside of the inner membrane 40 before being deposited on the ground, no liquid can run onto the outer membrane 42. This means that the sprayed liquids are prevented from coming into contact with the outer membrane 42 and that the spray liquids cannot then contact the crops or other vegetation after collecting around the edge of the skirt 14.

The outer membrane 42 is also used to deflect around hard objects, such as tree or bush stems, stones or mounds of soil as the crop sprayer is moved along the crop inter rows. The outer membrane 42 being formed of a flexible material means that it is able to deform if in contact with hard objects. However, having the incorporated stiffening ribs 44, 45, means the flexible skirt 14 (i.e. the outer membrane 42) can quickly return to shape and maintain the necessary gap between the outer membrane 42 and the inner membrane 40. Due to the stiffening ribs 44, 45, it is less likely that the outer membrane 42 will be distorted enough to come into contact with the inner membrane 40.

In the present embodiment of the invention for use in the crop inter row, the longitudinal ends 50, 51 of the outer membrane 42 produce a sharper, more pointy shape. Conventionally, longitudinal end 50 defines the front of the shield 10. Therefore, the longitudinal end 50 can push plants and crops to the side as the shield 10 passes through the crop inter row. These crops in the crop rows may be overhanging the crop inter row. The pushing of the crops to the side of the shield 10 by the outer membrane 42 means that contact of the PPPs or other liquids, such as herbicide, onto the crop is avoided. The flexible form of the skirt 14 also prevents damage to the crops as they are pushed aside. This applies to circular forms of the double membrane flexible shield also. This is not always the case with fully rigid shields.

The skirt 14, through use, may become worn over time as it comes into contact with the ground and stones. The current invention allows the worn skirt 14 to be quickly and easily replaced. Also, the inner membrane 40 is not as close to the ground as the outer membrane 42 which avoids the inner membrane 40 contacting the ground and wearing out before the outer membrane 42. Therefore, the integrity of the inner membrane 40 is maintained.

It will be appreciated by persons skilled in the art that various modifications may be made to the above embodiment without departing from the scope of the present invention as defined by the claims. Whilst the above discussion has been concerned with a shield for spraying liquid such as PPPs onto weeds in the crop inter row, the invention is equally applicable to a shield for spraying any plant protection products (PPP), or other sprayed liquids, in different scenarios. For example, the invention can be used for sprays in amenity or forestry and not just for crop spraying. Also, circular, cylindrical, elliptical, square, rectangular or any other shaped shields can be used to protect spray patterns in a fan-shape, circular-shape, elliptical-shape, square-shape or rectangular-shape etc. Therefore, the present invention can be used to prevent contact of the sprayed liquid with crops, vegetation, trees, buildings or anything else as required outside the shield. While the present invention has been particularly described, in conjunction with a specific preferred embodiment, it is evident Thus, having described the invention, what is claimed is:

1. A crop sprayer for spraying liquid onto one of a target area and band on the ground in crop inter rows comprising:
   a shield;
   a nozzle arrangement for spraying liquid in a spray pattern;
   wherein the shield comprises a hood at an upper portion of the shield and a flexible skirt at a lower portion of shield;
   wherein the shield surrounds the nozzle arrangement and the spray pattern allowing liquid to be sprayed onto the one of target area and band through an opening at the bottom of the shield;
   wherein the skirt comprises a flexible closed inner membrane and a flexible closed outer membrane which encircle the opening and extend fully around the circumference of the skirt, wherein there is a gap between the bottom edge of the inner membrane and the outer membrane when the flexible skirt is in an undeformed shape such that liquid sprayed from the nozzle arrangement that runs down the inner membrane cannot run onto the outer membrane, and wherein the inner membrane is located between the outer membrane and the nozzle arrangement and the outer membrane is connected to the inner membrane around the full circumference of the skirt such that no liquid sprayed from the nozzle arrangement sprays onto or accumulates on the outer membrane.

2. The sprayer of claim 1, wherein the inner membrane extends towards the one of target area and band, and the outer membrane extends towards the one of target area and band, and outwardly from the centre of the skirt at an angle.

3. The sprayer of claim 1, wherein the outer membrane extends to closer to the one of target area and band than the inner membrane.

4. The sprayer of claim 1, wherein the skirt is detachable from the hood.

5. The sprayer of claim 4, wherein the skirt is attached to the hood by quick release fasteners.

6. The sprayer of claim 1, wherein the outer membrane comprises stiffening ribs.

7. The sprayer of claim 6, wherein one of the stiffening ribs extends around the circumference of the lowermost part of the outer membrane and further stiffening ribs spaced around the circumference of the outer membrane extend upwards from the lowermost part of the outer membrane.

8. The sprayer of claim 1, wherein the hood is made of one of metal and plastics.

9. The sprayer of claim 1, wherein the skirt is made of one of an elastomer and an equally flexible material.

10. The sprayer of claim 1, wherein the shield is one of cone shaped and dome shaped.

11. The sprayer of claim 2, wherein the outer membrane is oval with longitudinal ends of the outer membrane extending at an angle greater than the angle that transverse sides of the outer membrane extend.

12. The sprayer of claim 1, wherein the opening of the shield is one of oval, circular and rectangular.

13. The sprayer of claim 1, wherein the sprayer is configured to spray one of target area and band on the ground in crop inter rows.

14. The sprayer of claim 1, further comprising a ground following mechanism.

15. The sprayer of claim 1, wherein the flexible skirt acts to deflect the crops away from the shield.

16. The sprayer of claim 1, wherein the shield is flexible enough to deform around the one of crop and object to allow spraying right up to the one of crop and object.

17. A shield as defined in claim 1 for use in a sprayer for spraying liquid onto one of a target area and band.

18. The shield as defined in claim 15, wherein the sprayer is configured to spray the one of target area and band on the ground in crop inter rows.

19. The sprayer of claim 1, wherein the shield is configured to be wheeled over the ground.

20. The sprayer of claim 1, wherein the shield comprises a ground following wheel.

21. The sprayer of claim 1, wherein the outer membrane is connected to the inner membrane directly below the hood around the full circumference of the skirt.

* * * * *